Patented Feb. 17, 1953

2,628,986

UNITED STATES PATENT OFFICE 2,628,986

ALCOHOL PURIFICATION PROCESS

Edwin G. Wallace, Walnut Creek, and Jacob J. Menn, Martinez, Calif., assignors to Shell Development Company, San Francisco, Calif., a corporation of Delaware No Drawing. Application October 29, 1949, Serial No. 124,503

4 Claims. (Cl. 260—643)

This invention relates to an alcohol purification process, and it is particularly directed to a method whereby the odor and other properties of refined grades of isopropanol and similar alcohols may be greatly improved.

The lower aliphatic alcohols such as ethanol, isopropanol and butanol, for example, are extremely important chemicals from the commercial standpoint, and while produced and marketed in a variety of grades, the demand for products of the highest purity has become increasingly great. In an effort to meet this demand the practice has been to subject the alcohol to repeated fractional distillation treatments whereby there are produced distillates which contain only traces of impurities and are therefore of high purity from an analytical standpoint. On the other hand, while this impurity content may be quantitatively small, it is nevertheless sufficient to impart an off-odor to the product which greatly impairs its utility for many industrial applications. In the case of ethanol, isopropanol and like alcohols produced by the catalytic hydration of olefins, some of these impurities have been identified as unsaturated aldehydes, though the nature of others is not known and they can only be described as "sulfurous," "polymeric" or "ethereal," terms which in many cases are suggested more by the odor of the product than by any analytical data.

It is an object of this invention to provide a method for purifying alcohols and especially for improving the odor thereof. A more particular object is to effect such odor improvement in the case of isopropanol and like alcohols which have been produced by the catalytic hydration of olefins, and which thereafter have been subjected to fractional distillation treatment. The nature of other objects of the invention will be apparent from a consideration of the following description.

It is our discovery that the odor of alcohols having a non-characteristic, foreign, or off-odor may be greatly improved by bringing the alcohol into contact with an ion exchange resin. The improvement in odor which results from this treatment is particularly great in the case of isopropanol produced by hydration of propylene in the presence of an acid catalyst and thereafter purified by fractional distillation. In most cases the improvement in odor effected in this manner is accompanied by a desirable increase in the so-called "permanganate-time" of the alcohol.

The ion exchange resins employed in carrying out the process of the invention may be of either the cation or the anion-exchange variety. Representative anion-exchangers are those of the phenolic-formaldehyde-polyamine type or those prepared by the condensation of aliphatic polyamines with poly-halogen derivatives of hydrocarbons; particular commercial anion-exchangers are those marked by The Resinous Products and Chemical Company under the trade name Amberlite IR–4B and IRA–400, as well as the products Ionac A–300 and A–293–M of the American Cyanamid Company. Representative cation-exchangers which may be used in the process of the invention are, for example, the phenolic-formaldehyde-sulfonic acid resins and the cross-linked, poly-styrene-sulfonic acid resins, illustrative commercial products of this variety being the Amberlite IR–100, IRC–50 and IR–120 resins of The Resinous Products and Chemical Company as well as the products Ionac C–200 and C–212 of American Cyanamid Company.

In practicing the present invention, the alcohol to be purified is brought into intimate contact with the ion exchange resin under ambient conditions of temperature and pressure, though, if desired, somewhat more elevated temperatures may be used. This may be accomplished either by mixing the resin with the alcohol and then filtering off the purified liquid, or by passing the alcohol through a bed of the resin until a reappearance of an off-odor in the alcohol indicates approaching exhaustion of the resin. In either case the used resin may then be regenerated in the conventional manner, after which it is again ready for use. Thus, the anion-exchangers are regenerated by flushing them with a dilute solution of an alkaline material such as sodium hydroxide, ammonium hydroxide or sodium carbonate, while the cation exchangers are washed with a dilute solution of hydrochloric acid, sulfuric acid, or other acid material. If desired, the alcohol under treatment may be exposed simultaneously to both anion and cation exchangers, or it may be passed first through the one type of resin and then through the other.

The purification achieved by treating alcohols with one or more ion exchange resins according to the process of this invention was quite unexpected since the impurities believed to be present in the alcohols, and particularly in isopropanol produced through catalytic hydration of propylene and thereafter fractionally distilled, were not considered as being of a type permitting preferential adsorption by ion-exchange resins. Such impurities are largely non-ionic in character and there was no reason to expect that ion-exchange resins would exert any particular affinity for them, an affinity which, however, proved to be much greater than that exerted by conventional absorbents such as activated carbon, for example.

While the present invention has been described as it particularly relates to the purification of alcohols previously subjected to one or more fractional distillation steps, the treatment with an ion-exchange resin may be practiced with good effect even in the case of those alcohols which have not been fractionally distilled, or wherein that treatment has been curtailed. Further, the step of treating the alcohol with resin may be coupled with other purification treatments, as those involving hydrogenating the alcohol or refluxing it with caustic or permanganate either before or after treatment with the ion-exchange resin. In this connection, a particularly effective procedure for purifying isopropanol produced by catalytic hydration of propylene is that wherein the alcohol is first fractionally distilled until at least about 85% pure and is then treated, preferably under reflux conditions, with from about 0.1 to 5 mole percent of potassium permanganate or other oxidizing agent such as sodium hypochlorite, hydrogen peroxide, and sodium chromate or dichromate before being brought into contact with the ion-exchange resin. The purified isopropanol obtained in this manner, which may, if desired, be given one or more additional fractional distillation treatments, has an extremely pure odor. Moreover, the alcohol given such a preliminary oxidation treatment before being deodorized over the ion-exchange resin has a better resistance against deterioration in odor on being stored than is the case when the oxidation step is omitted.

The following examples illustrate the present invention as it relates to improving the odor of refined isopropanol prepared by the direct hydration of propylene in the presence of a sulfuric acid catalyst and thereafter subjected to successive fractional distillation treatments. The product obtained in this manner contains at least 99% isopropanol, with the balance consisting essentially of water together with traces of various organic impurities of undetermined nature and origin, and its odor is relatively poor.

*Example I*

Refined isopropanol of the type described in the preceding paragraph was passed for approximately 20 hours at a liquid hourly space velocity of one, and at a temperature of from 23 to 25° C., through a 2" x 36" vertical tube packed with Amberlite IR-4B anion-exchange resin which had been freshly regenerated by treatment with a 5% solution of sodium hydroxide. The resulting resin-treated isopropanol, as well as a sample of the starting alcohol, were then each distilled in a 40 plate Oldershaw column, taking a small forecut at 20:1 reflux ratio and a heartcut, comprising 90 to 95% of the distillation charge, at 80 to 82.2° C. Samples of both heartcuts were diluted with nine times their volume of distilled water and the diluted samples then judged by a panel of seven observers. In the judgment of the various observers, and assuming a product of the best obtainable odor to have a rating of 100%, the sample obtained from the starting isopropanol had an average rating of but 29% whereas that of the resin-treated isopropanol was 80%.

In similar operations conducted under substantially the same conditions as described in the preceding paragraph, but using Amberlite IRA-400, Ionac A-300 and Ionac A-293-M anion-exchange resins in place of the Amberlite IR-4B, there were obtained products whose average odor ratings were 85, 80 and 65%, respectively. Again, other operations were conducted under these same conditions but using the cation-exchangers Amberlite IR-100, Amberlite IR-120, Amberlite IRC-50, Ionac C-200 and Ionac C-212, the recovered isopropanol solutions having average percentage ratings of 60, 65, 80, 80 and 80%, respectively.

*Example II*

In this operation the refined isopropanol starting material was first refluxed at 85° C. for ½ hour in the presence of 0.29 mole percent of potassium permanganate. At the end of this time the manganese dioxide formed during the refluxing, together with any other solids present in the liquid, was filtered off and a portion of the filtrate was treated with Amberlite IR-4B anion-exchange resin in the manner described above in Example I. Comparative odor tests were then made by seven observers between the refined starting alcohol, the potassium permanganate treated alcohol, and the product treated with both permanganate and resin, all samples having been given a final distillation treatment in an Oldershaw column and diluted to 10 times their volume with distilled water. In this test the starting alcohol received an average rating of approximately 30% whereas that of the permanganate-treated alcohol was 50% and that of the alcohol treated with both permanganate and resin was 93%. It was observed that the last-mentioned alcohol, of all the samples here described in both examples, had the best resistance against deterioration in odor during long continued storage.

The processes described in the foregoing examples are equally effective when applied to other alcohols as, for example, to ethanol and other aliphatic monohydric alcohols produced by catalytic hydration of olefins.

The invention claimed is:

1. In a process for improving the odor of isopropanol produced by the catalytic hydration of propylene and purified to a purity of at least 85%, the balance being essentially water together with traces of organic impurities largely non-ionic in character by fractional distillation, the step comprising refluxing the fractionally distilled isopropanol in the presence of from about 0.1 to 5 mol percent of an oxidizing agent, and thereafter bringing the isopropanol into intimate contact with an ion exchange resin.

2. The method of claim 1 wherein the resin is an anion exchanger.

3. The method of claim 1 wherein the resin is a cation exchanger.

4. In a process for improving the odor of isopropanol produced by catalytic hydration of propylene followed by fractional distillation to produce isopropanol of at least about 99% purity but containing impurities largely non-ionic in character, the improvement which comprises treating the fractionally distilled isopropanol under reflux with from about 0.1 to 5 mole percent of hydrogen peroxide and thereafter intimately contacting the isopropanol with an anion exchange resin whereby both the odor and the odor stability of the isopropanol are improved.

EDWIN G. WALLACE.
JACOB J. MENN.

REFERENCES CITED

The following references are of record in the file of this patent:

UNITED STATES PATENTS

| Number | Name | Date |
|---|---|---|
| 2,188,274 | Bump | Jan. 23, 1940 |
| 2,463,677 | Brandner | Mar. 8, 1949 |
| 2,485,485 | Dudley et al. | Oct. 18, 1949 |